3,139,147
FORMATION TESTING APPARATUS
Thomas G. Hays, 10059 Timber Oak, and Floyd J. Adcock, 2303 Campbell Road, both of Houston 24, Tex.
Filed May 4, 1962, Ser. No. 192,381
11 Claims. (Cl. 175—233)

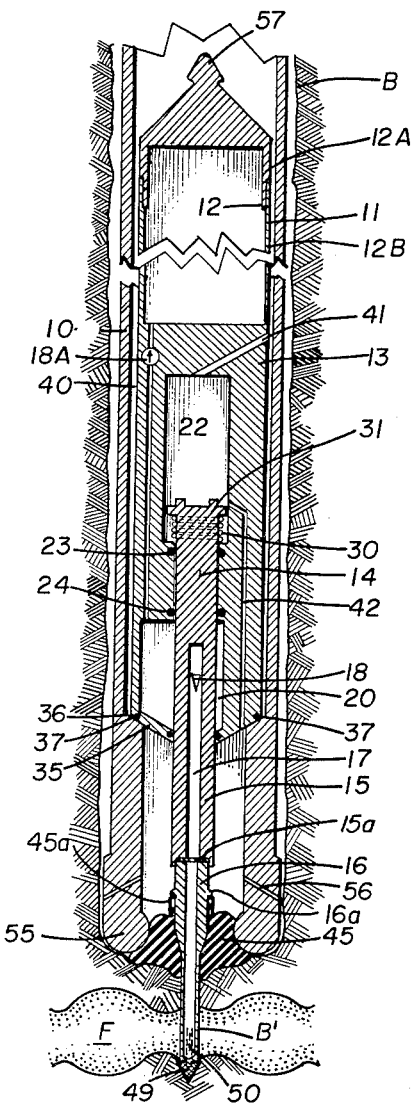
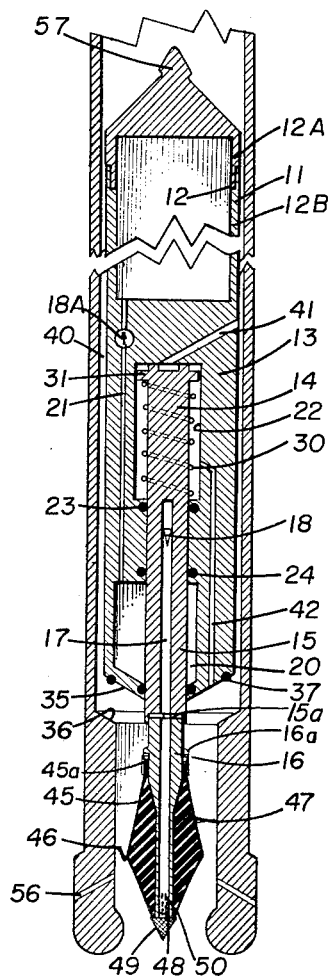
Fig.-2
Fig.-1
INVENTOR.
THOMAS G. HAYS
FLOYD J. ADCOCK
ATTORNEYS United States Patent Office 3,139,147
Patented June 30, 1964

This invention relates to formation testing apparatus and more particularly to retrievable bottom hole formation testing devices used to sample fluids and gases of carbonaceous deposits and the like.

Present practices of formation testing are generally classified under the designation "drill stem testing" or "wireline formation testing." The efficiency of drill stem testing is unquestioned. However, such tests are very expensive due to rig time and lost operational time which must be added to actual test costs. Also, where unconsolidated formations might be encountered as in the Gulf Coast area of the United States, the expense of running pipe is added to the above expenses because of the risk involved in open hole drill stem tests. The inability to circulate mud during a drill stem test increases the possibility of sticking the drill pipe.

Formation testing practices in the wireline formation testing category are more widely utilized today because they are more economical, and qualitative interpretation of samples is becoming more reliable.

However, even wireline testing practices present certain inherent operating difficulties due to the fact mud usually cannot be circulated during actual testing operations compounding the risk of tool loss in the hole. Tool loss calls for expensive fishing jobs and possible loss of the hole. Also, most available wireline testing devices have limited reservoir capacity which has restricted the quantity of formation fluids and gases which could be recovered.

Another difficulty with many wireline testing practices and devices is that mud usually has been against the formation for a considerable period of time allowing filtrate or mud to dilute or completely exclude samples which are truly representative of formation fluids.

It has been suggested that a "pilot" or "rat" hole, so called, be separately drilled at the bottom of a hole and a test probe inserted therein to thereby exclude contact with adulterated formation fluids and drilling mud. The problems of drilling separate pilot holes and the care necessary to thereafter insert a test probe therein at the bottom of a deep hole are well known in this art.

Accordingly, it is an object of the present invention to provide a simple, efficient and economical wireline testing tool which is adapted to test uncut formation and obtain uncontaminated samples therefrom.

One object of the invention is to provide a simple, durable and efficient wireline testing device which has great simplicity of operation such that regular drill site personnel can successfully carry out testing operations without specialized instruction and training.

A further object of the invention is to provide apparatus adapted for formation testing during conventional drilling operations.

Another object of the invention is to provide simple testing mechanism of the wireline testing type which may be kept at a drill site during an entire drilling operation without undue expense.

A further object of the invention is to provide a simple and efficient formation testing apparatus which is capable of circulation of drilling fluid during actual testing operations at a hole bottom.

Yet another object of the invention is to provide formation testing apparatus which is adapted to run test operations from within a core barrel of a core bit in place in a hole, thereby substantially reducing down time and loss time on a drill rig.

One embodiment of a wireline testing device embodying the concepts of our invention includes a retrievable tool comprised of two telescopic sections. The first is a cylindrical body section which is of lesser diameter than a core barrel such that it is easily inserted therein without specialized equipment or tools. The second section is an extensible probe portion. The cylindrical section contains a sample storage reservoir, a gathering chamber therefor, and a hydraulic chamber. The probe section includes a piston actuated by mud pressure and a novel arrangement of valves is provided, whereby drilling mud is selectively captured to actuate the drive piston and force the test probe into an uncut portion of formation below the bit, and to thereafter allow by-pass of mud for purposes of lubricating drilling bits and continuing mud circulation throughout the bore hole. A plunger which depends from the piston includes the test probe, sample conduit and a cutting head. The test probe has a passage running substantially its longitudinal extent adapted for selective communication with the sample reservoir and has a replaceable choke intermediate the ends thereof whereby the passage of formation fluid therein is selectively restricted. A resilient packer seal or sleeve is mounted about a lower portion of the test probe and is maintained thereon between an integral portion of the probe and the probe bit. The seal is adapted to be deformed in place and to completely seal the test probe, and thus the formation to be tested, from adulterated formation fluids and drilling mud.

The elements comprising formation testing apparatus as above described further include a spring adapted to return the piston and test probe to inoperative position when the mud pumps are shut down and the testing operation is completed. The testing device is retrieved by use of conventional wireline coring techniques. This includes engagement of a retriever cone with the grapple of a wireline and lifting of the testing device to the surface.

Further details and other objects and advantages of testing apparatus according to the concepts of our invention will be apparent to those skilled in the art from a study of the following description of the invention making reference to the appended drawings, in which like reference numerals are used to designate like parts in the several views. In these drawings:

FIG. 1 is a vertical central section of a preferred embodiment of a bottom hole formation tester according to our invention shown in an inoperative and pre-test stage in a drill hole; and FIG. 2 is the bottom hole formation tester shown in FIG. 1 an an operative position at the bottom of the drill hole.

In FIG. 1 a bottom hole formation testing tool 11 is shown immediately before it contacts the bottom of an outer core barrel 10. Tool 11 has a fluid sample chamber 12 in its upper portion while an intermediate cylindrical portion 13 contains a reciprocal piston 14 and a depending portion 15 of this piston has its lower end internally threaded for threaded connection with a test probe 16. A coupling member 57 is mounted on the top of tool 11 for connection with the grapple of a wireline retrieving device. The chamber 12 is formed between the downwardly opening shell 12A and the upwardly opening cup 12B which are adapted for threaded interconnection. With this arrangement the volume of chamber 12 is variable by substitution of upper shell section 12A. A fluid sample conduit 17 extends through plunger 15 and test probe 16 and discharges at its upper end through an opening comprising the inlet port 18 of a gathering chamber 20. Port 18 operates as a valve which is closed in a probe retracted position and open in a probe extended position as is described below. The gathering chamber 20 is interconnected with sample reservoir 12 by a passage 21 extending through the intermediate portion 12 of the tool at one side of hydraulic chamber 22 in which piston 14 is mounted. O-ring type seals 23 and 24 seal the passage through which plunger 15 moves and operate to maintain port 18 in a closed condition thereby preventing fluid leakage between gathering chamber 20 and chamber 22. A spring 30, mounted on the exterior of piston 14, is adapted to maintain it in an inoperative position at the top of chamber 22 with its sampling probe retracted when not in use. A centrally apertured replaceable choke 15A is included at the joint between probe 16 and plunger 15.

The lower end of core barrel 10 carries a bit portion 55 having a mud circulating passage 56, and an inclined shoulder or seat 36 at the top of bit portion 55 provides a stop for a similarly inclined bottom surface 35 of gathering chamber 20. Suitable seals 37 prevent mud flow between inclined bottom 35 and inclined seat 36 when the lowering movement of the gathering chamber is arrested.

An annular mud passage 40 is provided between the inner wall of core barrel 10 and the exterior surface of tool 11 when the latter is lowered to the bottom of the hole. A mud inlet 41 connects passage 40 with the top of chamber 22 in register with the head portion 31 of piston 14 and a by-pass passage 42 extends upwardly through inclined bottom 35 and connects with the lower portion of chamber 22.

Test probe 16 is stepped or swaged for a major portion of its lower extent and adapted for reception of the resilient packing sleeve 45, preferably fabricated of rubber or rubber-like material. Sleeve 45 has an enlarged central portion 46 slowly tapering to a narrow portion 47 adapted to encompass a widened portion of test probe 16. The forward portion of seal 45 tapers inwardly and terminates adjacent the lower end 48 of probe 16 above probe bit 49. The top of seal 45 is encompassed by an apertured cup or ring 45A which is bonded thereto. A shoulder 16A of the probe bears against ring 45A and, when the probe is extended, deforms the seal and causes it to flow about the extended probe and seal it from adulterating materials in bore hole B. A plurality of slots or sampling apertures 50 are located in the probe adjacent its lower end and in the inoperative position as shown in FIG. 1 resilient sealing member 45 covers apertures 50.

In FIG. 2 bottom hole formation tester or tool 11 is shown disposed within the outer core barrel 10 at the bottom of a bore hole B with its test probe 16 extending into a pilot hole B'; and sampling fluid is schematically indicated at F. To reach this operational position, the bottom hole formation tester 11 is given a free fall down the pipe string within the outer core barrel 10 and the free fall may be assisted by pumping pressure. As it reaches its lowermost position at the bottom of the core barrel, the stepped shoulder 35 seats against shoulder 36 and is sealed thereagainst by the annular seal 37. Continued pumping pressure causes mud to flow through annular passage 40 and pass through inlet passage 41 above piston head 31.

The by-pass passage 42 is closed when tool 11 is in this position because of seal 37 between shoulders 35 and 36. Continued application of pumping pressure on the drilling mud forces piston 14 downward against the resistance of spring 30 and in this operation, the test probe bit 49 is forced downwardly through the formation to form hole B' and place sampling apertures 50 in a position to sample unadulterated formation fluids F. During such downward movement of the test probe, resilient packing seal or sleeve 45 is deformed under the pressure of shoulder 16A on ring 45A and the lower portion of the sleeve is wedged in pilot bore B'; the thicker central portion is deformed and bows out to completely seal hole B' from access with the drilling mud or adulterated formation fluid in hole B as is schematically indicated in FIG. 2. At the same time the sampling apertures 50 are uncovered.

Formation fluids and gases flowing through apertures 50 pass upwardly through sampling conduit 17, through sample inlet port 18, one-way check valve 18A, and into the gathering chamber 20. Port 18 is triangularly shaped with its vertex extending downwardly to minimize the initial surge pressure of formation fluids, preventing formation breakdown which would clog apertures 50. Once gathering chamber 20 is filled, fluid pressure forces the sampled fluids and gases upwardly through conduit 21 and into the fluid chamber or reservoir 12. The sampling, which may be on the order of a few minutes, as long as an hour, or longer if desired, commences as soon as piston 14 is at its lowermost position with port 18 in communication with chamber 20; and drilling mud is allowed to circulate around bit 55 because of access to by-pass passage 42 through chamber 22 and drilling mud inlet 41 during the sampling interval. Thus, during the entire sampling operation, there is lubrication of the drill core bit 55 thereby preventing undesirable sticking or loss of the bit and core barrel in the bore hole.

Release of pumping pressure causes piston 14, its plunger 15 and attached test probe 16 to move upwardly under the action of spring 30 into a retracted and inoperative position. The next procedure is to retrieve bottom hole formation tester 11 and the sample contained in reservoir 12. To do so retriever coupling 57 is engaged by a wireline grapple (not shown) and retracted. During retraction and after release of pumping pressure in which sampling probe 16 is withdrawn from hole B', port 18 is moved out of contact with chamber 20 thereby preventing egress and loss or adulteration of sampled fluid.

In a typical cycle of operation of a bottom hole formation tester constructed as shown in FIGS. 1 and 2, tool 11 with the correct sample tube for a given type of formation, pressure and drill bit is made up on the surface with drive piston 14 in its retracted position as shown in FIG. 1. The tool is then dropped into the drill pipe to free fall or be pumped into place immediately above a core bit. The seal 37 disposed between abutting surfaces 35 and 36 blocks the mud flow to the bottom of the hole and continue mud pump pressure is applied through inlet 41 to hydraulic piston chamber 22 above piston 14, so as to force test probe 16 and its cutting bit 49 into the formation below the bottom of a bore hole. As the test probe is directed into the formation, the resilient packing sleeve 45 is deformed and moved into sealing contact with the irregular surfaces around the test hole formed by the extended test probe. When the test probe is in its fully extended position, mud flow into chamber 22 moves drive piston 14 to the bottom of chamber 22. This opens a by-pass for drilling mud allowing lubrication of drilling bit 55 and adjacent parts. The action of opening the tool creates an increased pressure differential between the bore hole B and the pilot hole B' and with the packer seal 45 in place between these two areas of high and low pressure the seal is further intensified. At the same time formation fluid F moves through sampling apertures 50 and interconnecting passages to the fluid reservoir or chamber 12.

When testing is completed and mud pumps are shut down, under the diminishing pressure, spring 30 moves piston 14 to its retracted and inoperative position and thereby returns test probe 16 and apertures 50 within the confines of resilient packing sleeve 45 and closes port 18 thereby preventing escape of sampled fluids and gases from the tool. The tool is then retrieved by conventional practices and the contained sample is measured and tested on the surface.

The apparatus illustrated herein and its operation information testing as described herein represent preferred practice of the invention. Changes in size, shape and arrangement of parts and in the operating procedure may be availed of within the spirit and scope of the invention as defined in the hereunto appended claims.

We claim:

1. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, and sealing means on the probe for preventing admission of formation fluids to the testing device other than through the ingress opening to the internal passage of the plunger.

2. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end, including a bit and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger bit to penetrate uncut formation at the bottom of the hole, and sealing means on the probe for preventing admission of formation fluids to the testing device other than through the ingress opening to the internal passage of the plunger.

3. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, sealing means on the probe for preventing admission of formation fluids to the testing device other than through the ingress opening to the internal passage of the plunger, and a spring in the hydraulic chamber for returning the piston to its inactive position on the termination of the pumping pressure.

4. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, sealing means on the probe for preventing admission of formation fluids to the testing device other than through the internal passage of the plunger, and means at the upper end of the cylindrical body for coupling connection with a wireline grapple to retract the cylindrical body from the bore hole.

5. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, and distortable sealing means on the probe for engaging the formation and preventing admission of formation fluids to the testing device other than through the internal passage of the plunger, and means arranged to retract the plunger and close the port when the probe is withdrawn from the formation.

6. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating the passage under pumping pressure enters the hydraulic chamber and forces the piston downwardly thereby causing the plunger probe to enter uncut formation at the bottom of the hole, means for allowing circulation of mud through the hydraulic chamber when the probe enters uncut formation, and sealing means on the probe for preventing admission of formation fluids to the testing device other than through the ingress opening to the internal passage of the plunger.

7. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, a one-way valve in the conduit to the storage chamber whereby egress of fluid therefrom is prevented when the device is in inoperative position, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, and sealing means on the probe for preventing admission of formation fluids to the testing device other than through the ingress opening to the internal passage of the plunger.

8. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, said outlet being generally triangularly shaped with its vertex downwardly directed substantially along the lengthwise axis of said plunger, a lower collection chamber in said body through which the plunger extends and means for pressure-sealing between the chamber and the plunger, an upper sample storage chamber in the body above the hydraulic chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, and sealing means on the probe for preventing admission of formation fluids to the testing device other than through the ingress opening to the internal passage of the plunger.

9. A bottom hole formation testing device, comprising a cylindrical body of lesser diameter than the outer core barrel of a core bit into which it is lowered and including a hydraulic chamber, a piston mounted in said chamber and having a head disposed at the top of the chamber in an inactive position, a plunger carried by and depending from said piston and having a formation probe at its lower end and an internal passage for circulating fluids, there being an ingress opening into said passage at the lower end of the probe and an outlet at the upper end of the plunger, a lower collection chamber in said body through which the plunger extends and means for pressure-sealing between the chamber and the plunger, an upper sample storage chamber in the body above the hydraulic chamber, separable members defining said storage chamber, a conduit extending through the body for delivery of sample fluid from the collection chamber into the storage chamber, the space between the core barrel and the cylindrical body comprising a mud circulating passage, there being a port between the mud passage and the top of the hydraulic chamber whereby mud circulating in the passage under pumping pressure enters the hydraulic chamber and forces the piston downwardly thereby causing the plunger probe to enter uncut formation at the bottom of the hole, and sealing means on the probe for preventing admission of formation fluids to the testing device other than through the ingress opening to the internal passage of the plunger, the volume of said storage chamber being variable by substitution of a separable member of a given size for a corresponding separable member of a different size.

10. The combination with a hollow drill bit in contact with formation to be sampled and having a hollow barrel portion supporting said bit at the end of the drill string, of a sampling device responsive to mud pumping pressure adapted for lowering into the hollow interior of said bit and including means on the device arranged to engage an internal surface of the bit for limiting downward movement of the device, an upper cylindrical portion of the device containing a sample reservoir, a body portion containing a collection chamber, a probe portion movably supported by the body portion, means for moving the probe portion in response to the mud pumping pressure to an extended position to penetrate the uncut formation below the bit, the probe portion having an internal passage with an ingress opening into said passage and a valve controlled outlet leading to the collection chamber allowing formation fluids to pass into the collection chamber when the probe portion is in the extended position, means for delivering the extracted fluids from the collection chamber to the reservoir, means for sealing the testing device from adulterated fluids during sampling, and means for withdrawing the probe from the penetrated formation on termination of the pumping pressure.

11. The combination with a hollow drill bit in contact with formation to be sampled and having a hollow barrel portion supporting said bit at the end of a drill string, the sampling device responsive to mud pumping pressure adapted for lowering into the hollow interior of said bit and including means on the device arranged to engage an internal surface of the bit for limiting downward movement of the device, an upper cylindrical portion of the device containing a sample reservoir, a body portion containing a collection chamber, a probe portion movably supported by the body portion, means for moving the probe portion in response to the mud pumping pressure to an extended position to penetrate the uncut formation below the bit, the probe having an internal passage with an ingress opening into said passage and a valve controlled outlet leading to the collection chamber allowing formation fluids to pass into the collection chamber when the probe is in the extended position, means for delivering the extracted fluids from the collection chamber to the reservoir, means for sealing the testing device from adulterated fluids during sampling, means for circulating mud around the device and within the bit during the fluid extraction, and means for withdrawing the probe from the penetrated formation on termination of the pumping pressure.

References Cited in the file of this patent

UNITED STATES PATENTS

| | | |
|---|---|---|
| 2,171,000 | Iden | Aug. 29, 1939 |
| 2,176,240 | Bandy | Oct. 17, 1939 |
| 2,418,500 | Chambers | Apr. 8, 1947 |
| 2,545,975 | Sewell | Mar. 20, 1951 |
| 2,557,925 | Stokes | June 26, 1951 |
| 2,626,777 | True | Jan. 27, 1953 |
| 2,740,477 | Monaghan | Apr. 3, 1956 |